United States Patent
Miller et al.

[11] Patent Number: 6,099,808
[45] Date of Patent: Aug. 8, 2000

[54] PARTICULATE REMOVAL FROM POINT OF USE EXHAUST SCRUBBERS

[75] Inventors: John D. Miller, Plano; W. Leon Cooley, Garland, both of Tex.; Tim Herman; Robert R. Moore, both of Napa, Calif.

[73] Assignee: Texas Instruments Incorporated, Dallas, Tex.

[21] Appl. No.: 08/131,643

[22] Filed: Oct. 5, 1993

[51] Int. Cl.[7] .............................. B01D 50/00; B03C 3/16; B03C 3/01

[52] U.S. Cl. .................................. 422/169; 96/28; 96/53; 96/57

[58] Field of Search ..................... 422/168, 169, 422/174; 55/101, 183

[56] References Cited

U.S. PATENT DOCUMENTS

| | | | |
|---|---|---|---|
| 4,066,525 | 1/1978 | Yeh | 204/186 |
| 4,208,383 | 6/1980 | Kisters et al. | 423/215.5 |
| 4,303,420 | 12/1981 | Howard | 55/242 |
| 4,324,759 | 4/1982 | Aoki et al. | 422/62 |
| 4,350,504 | 9/1982 | Piachuk | 55/217 |
| 4,530,822 | 7/1985 | Ashley et al. | 423/242 |
| 4,650,647 | 3/1987 | Kito et al. | 422/169 |
| 4,726,302 | 2/1988 | Hein et al. | 110/345 |
| 4,744,910 | 5/1988 | Bossard | 210/748 |
| 4,957,393 | 9/1990 | Buelt et al. | 405/128 |
| 5,176,088 | 1/1993 | Amrhein et al. | 422/169 |
| 5,250,267 | 10/1993 | Johnson et al. | 422/168 |

*Primary Examiner*—Robert J. Warden, Sr.
*Attorney, Agent, or Firm*—Ronald O. Neerings; Robby T. Holland; Richard L. Donaldson

[57] ABSTRACT

A submicron filter assembly (24) is added to an exhaust gas controlled destruction and oxidation unit (10). Controlled destruction and oxidation unit (10) treats exhaust gas from at least one semiconductor wafer fabricating reactor. The submicron filter (24) filters submicron particles out of the treated exhaust gas to prevent visible plumes from forming in wafer fab exhaust systems (stacks). The controlled destruction and oxidation unit (10) and submicron filter assembly (24) are ideally suited for use at the point of generation of the exhaust gases. In one embodiment of the invention, the submicron filter assembly comprises an electrostatic filter (26). The electrostatic filter (26) includes a positively charged first grid (28) and a grounded second grid (30). The second grid may include a mist screen for removing particulate build-up. In another embodiment of the invention, the submicron filter assembly (36) comprises a mist eliminator (38) and a HEPA filter (40).

17 Claims, 2 Drawing Sheets

FIG. 1 (PRIOR ART)
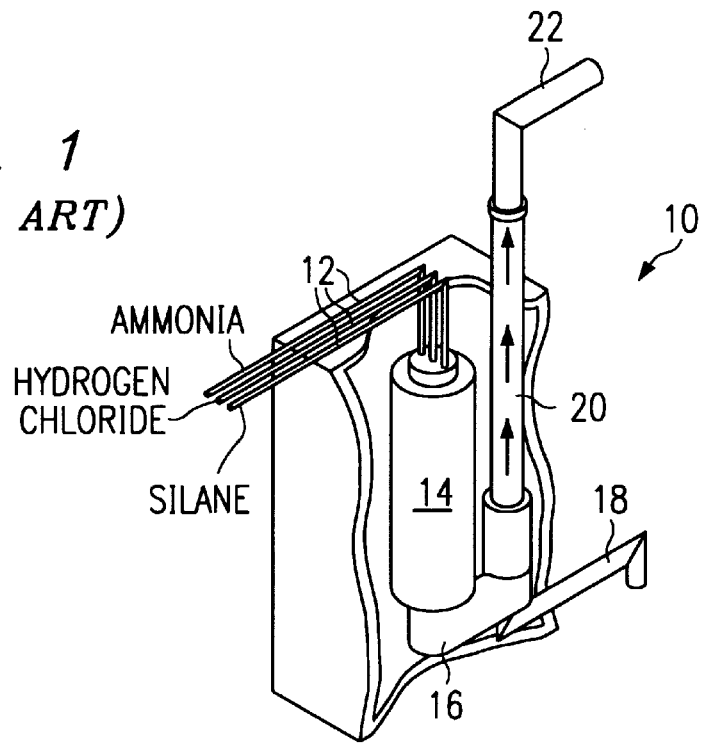
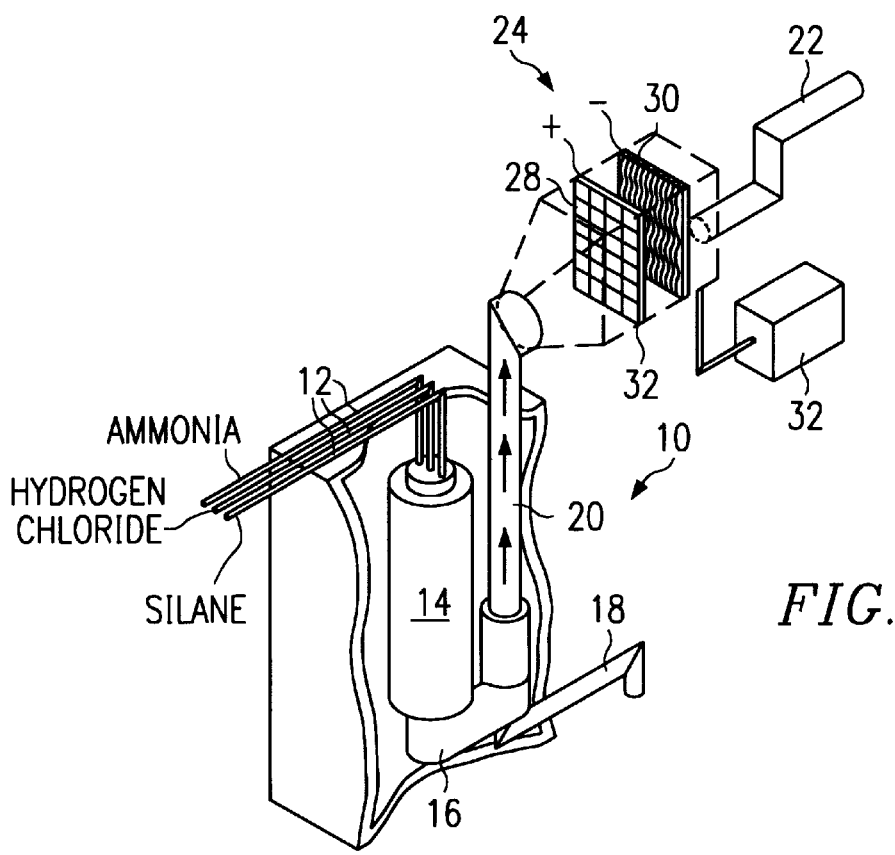
FIG. 2

6,099,808

PARTICULATE REMOVAL FROM POINT OF USE EXHAUST SCRUBBERS

FIELD OF THE INVENTION

The present invention relates to the field of equipment used to reduce factory generated air pollution. More specifically, the present invention relates to submicron particulate removal from point of use exhaust scrubbers to facilitate the reduction/prevention of visible plumes from semiconductor wafer fab exhaust systems (stacks).

BACKGROUND OF THE INVENTION

Manmade air pollution is a problem that increasing affects the health of mankind and the earth we live on. Factories are one of the largest air polluters. Gaseous byproducts generated by or as a part of manufacturing processes form a major portion of factory generated air pollution. Governments worldwide are taking a more aggressive role in legislating and regulating the amount of air pollution that factories may generate. In the United States, at least, each year seems to bring new and more restrictive government air pollution standards.

The semiconductor industry is but one of many industries trying to control air pollution. The venting of manufacturing process/reactant gases to the atmosphere is a major source of concern. Many semiconductor companies presently use central burn tubes and/or scrubbers to treat the gases from many reactors utilizing many processes (e.g., ammonia, hydrogen chloride, silane) before they are vented to the atmosphere. Many presently available burn tubes and scrubbers remove pollution particulates down to the micron size from the remaining exhaust gas(es). But burning these gases causes several unwanted side effects. Silicon dioxide is the result of silane burning in air—the resulting sand coats everything downstream from the burn tubes. Another disadvantage is that ammonium chloride is sometimes generated from the ammonia and hydrogen chloride reaction. More importantly, presently available central burn tubes and scrubbers do not control the problem of visible pluming from fume exhaust stacks. Central pollution removal systems are also expensive, costing millions of dollars to install, they must be able to treat and condition many different types of exhaust pollutants at the same time and they are difficult to modify to meet ever changing pollution standards.

All wafer fabs (world wide) are presently seeking an affordable solution to visible pluming from fume exhaust stacks. The prevention of these plumes will soon be a requirement of the U.S. Clear Air Act. Any wafer fab that uses Silane, HCL and Ammonia, in combination with water scrubbing systems will exhibit pluming. All CMOS processes use at least one combination of ammonia, hydrogen chloride, silane. A cost effective solution to the pluming problem is urgently needed.

SUMMARY OF THE INVENTION

The present invention disclosed herein comprises a submicron filter assembly added to an exhaust gas controlled destruction and oxidation unit. The controlled destruction and oxidation unit treats exhaust gas from at least one semiconductor wafer fabricating reactor. The submicron filter filters submicron particles out of the treated exhaust gas to prevent visible plumes from forming in wafer fab exhaust systems (stacks). The controlled destruction and oxidation unit and submicron filter assembly are ideally suited for use at the point of generation of the exhaust gases.

The submicron filter assembly comprises an electrostatic filter in one embodiment of the invention. The electrostatic filter includes high voltage AC potential between two charged grids. A series of mist screens may be located after the electrostatic grids to capture and wash away the charged particles. In another embodiment of the invention, the submicron filter assembly comprises a mist eliminator and a HEPA filter. Advantages of the submicron filter assembly include: 1) almost total removal of submicron particles; 2) low cost modification to existing destruction equipment; and 3) it is small enough to allow installation at point of generation of the exhaust gases.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a perspective view of a prior art controlled decomposition and oxidation unit.

FIG. 2 is a perspective view of a controlled decomposition and oxidation unit and a submicron filter assembly, according to one embodiment of the invention.

DETAILED DESCRIPTION OF PREFERRED EMBODIMENTS

Figure 3:
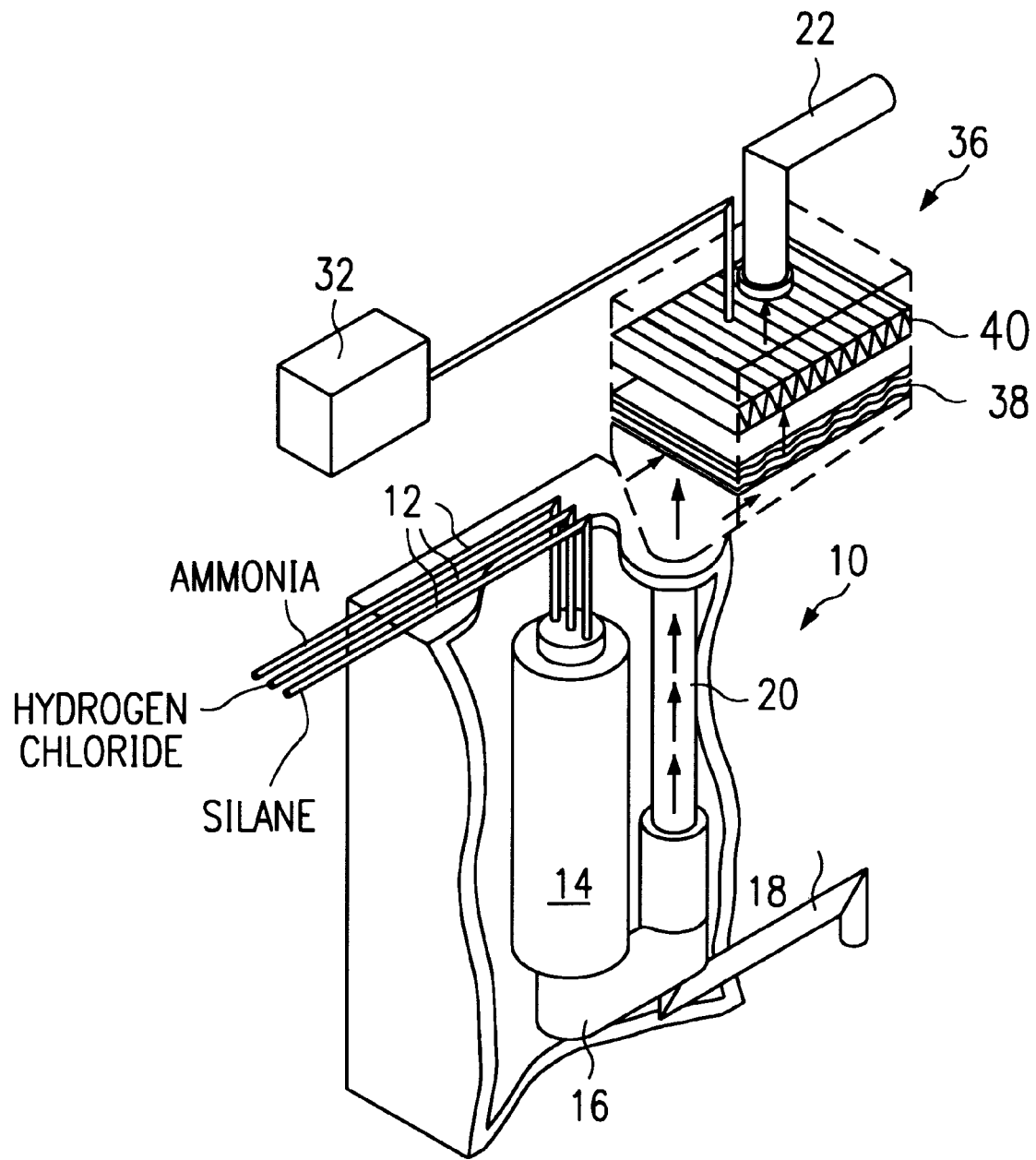
FIG. 3 is a perspective view of a controlled decomposition and oxidation unit and a submicron filter assembly, according to another embodiment of the invention.

FIG. 1 shows an exhaust gas destruction unit known in the art as a CDO (controlled decomposition oxidation) unit. CDO unit 10 is coupled to receive the exhaust gases from a small number of semiconductor processing reactors, not shown, via at least one exhaust gas vent line 12. The CDO unit shown is a Delatech model 857 that can handle an exhaust gas flow of a few cubic feet per minute CFM. The size and exhaust flow of each individual reactor will determine how many reactors can be coupled to the same CDO unit. In FIG. 1, CDO unit 10 is connected as close to the reactors as is practical to take advantage of the conditioned temperatures of the vented gases. Connecting a single CDO unit to reactors in close proximity to each other is referred to in the art as particulate removal from point of use exhaust scrubbers connected to receive exhaust gases at their point of generation. Point of generation connection is in contrast to a central burn tube and/or scrubber system which is typically remote from the reactors, is connected to many reactors, and is required to process hundreds if not thousands of cubic feet per minute CFM of polluted air. Connection of a single CDO unit to but a few reactors keeps the volume of gases as well as the number of process gases that need to be treated to a minimum thus simplifying proper destruction of the exhaust gas(es).

A vacuum pump or pumps, not shown, are used to pull the exhausted gases into CDO unit 10. CDO unit 10 breaks the gases down and oxidizes them at a high temperature—in this case 800 C. The Delatech model 857 has an inconel lined cylinder 14 with a heater core around it. Compressed air is injected into the cylinder as the source of oxidation. Nitrogen is injected around the compressed air to move the oxidation away from the injection nozzles. Oxidized gas(es) leaving cylinder 14 next enters scrubber 16. Scrubber 16 removes particulates from the oxidized gas(es) down to about the micron size. The removed particulates are washed down drain 18 into a sewer or directed to a holding tank to await further processing (not shown). The oxidized and scrubbed gas(es) is then directed up through CDO exhaust tube 20 and vented to the outside air via an exhaust duct (outside vent tube) 22. Unfortunately, the CDO unit does not eliminate pluming which is dependent upon wind speed, angle of the sun, humidity in the air and the number of submicron particulates released into the atmosphere at any given time. Moreover, the higher the percentage of submicron particulates remaining in the exhaust, the higher percentage of pluming. Millions if not billions of submicron particulates pass right through CDO unit 10 (and burn tubes and/or scrubbers if no CDO unit is used). Submicron particulates are one of the major causes of visible pluming.

FIG. 2 shows a submicron filter assembly 24 coupling CDO exhaust tube 20 to exhaust duct 22, according to one embodiment of the invention. Submicron filter assembly 24 removes submicron particulates that pass through CDO unit 10. Submicron filter assembly 24 houses an electrostatic filter 26. An electrostatic filter uses opposing charges to filter the air. As particulates pass through a first charged field, the particulates take on the charge of the first field. The second field is connected to a second charge, typically the opposite potential of the first grid. The oppositely charged particles are attracted to each other as well as the charged grids. Particles not captured by the charged grids are attracted to the mist screens which are typically grounded. An electrostatic filter used to filter particulates can be installed in almost any orientation, but the filter must be kept clean through manual cleaning or an automatic system added to remove the accumulated particulates. Cleaning of the electrostatic filter is especially important when filtering submicron particulates from semiconductor processing gasses such as ammonia, hydrogen chloride and silane.

In FIG. 2, the first 28 and second 30 fields of electrostatic filter 26 are vertically oriented. Both grids are connected to an alternating current high voltage source (15 KV in the present case), which charges the air/gas mixture around it including any particulates in the mixture. Second field 30 also acts as a mist screen by being electrically grounded and having water dripping down a media. Particulates charged by the electrostatic filter are attracted to the grounded mist screen. The water flowing through the media of the second field rinses the particulates from the mist screen and down a drain or into a holding tank. The oxidized, scrubbed and submicron filtered gas(es) then passes into exhaust duct 22 through which it is expelled to the outside atmosphere. A particle counting system 32 may be added to submicron filter assembly 24 to facilitate monitoring the number of particulates being expelled from filter assembly 24.

FIG. 3 shows a submicron filter assembly 36 coupling CDO unit 10 to exhaust duct 22, according to another embodiment of the invention. Submicron filter assembly 36 is also used to remove the particulates that pass through the scrubber (i.e., smaller than 1 micron). Submicron filter assembly 36 couples CDO exhaust 20 to exhaust hood 22. Submicron filter assembly 10 includes a mist eliminator 38 and a HEPA filter 40. Mist eliminator 38 is designed to remove residual moisture from the gases received from CDO exhaust 20 prior to the gas(es) passing through HEPA filter 40. Condensation build up on HEPA filter 40 will substantially reduce its effectiveness and longevity. Mist eliminator 38 removes moisture. In this embodiment of the invention, the gases being treated are cooled at least slightly below ambient temperature thereby reducing the moisture holding ability of the exhaust gas(es). The oxidized, scrubbed and demisted gas(es) is then passed through HEPA filter 40 which removes enough of the remaining submicron particulates to substantially reduce or eliminate exhaust pluming. The oxidized, scrubbed, demisted and submicron filtered gas(es) is then expelled to the outside atmosphere through exhaust duct 22. A particle counting system 32 may be added to submicron filter assembly 36 to facilitate monitoring the number of particulates being expelled from filter assembly 36. Submicron filter assembly 36 substantially reduces or eliminates exhaust pluming.

If the temperature of the exhaust gas(es) entering submicron filter assembly 36 is more than a few degrees above ambient temperature and if moisture build-up on HEPA filter 40 is excessive, additional scrubbers may be added to the CDO unit prior to connection to the submicron filter assembly to further reduce the temperature and moisture holding capacity of the exhaust gas(es).

The advantages of both embodiments of the invention include: 1) almost total removal of submicron particles; 2) low cost modification to existing destruction equipment; and 3) small enough to allow installation at point of generation of the exhaust gases.

While this invention has been described with reference to illustrative embodiments, this description is not to be construed in a limiting sense. For example, the submicron filter assembly may be adaptable to point of source connected air pollution removal equipment other than CDO (controlled decomposition oxidation) units or adaptable to air pollution removal equipment of other industries experiencing similar pluming problems. Various modifications to the illustrative embodiments, as well as other embodiment of the invention will be apparent to persons skilled in the art upon reference to this description. It is therefore contemplated that the appended claims will cover any such modifications or embodiments as fall within the true scope of the invention.

What is claimed:

1. A device, comprising:
   an input coupled to receive at least one exhaust gas;
   an exhaust gas destruction unit connected to said input for treating said at least one exhaust gas;
   a submicron filter assembly connected to said exhaust gas destruction unit for filtering submicron particulates out of said treated exhaust gas; and
   an output connected to said submicron filter assembly;
   wherein said submicron filter comprises an electrostatic filter, said electrostatic filter comprises two charged grids to which high voltage alternating current is applied and said grounded second grid includes a mist screen.

2. The device of claim 1 wherein said exhaust gas destruction unit is a controlled decomposition and oxidation unit.

3. The device of claim 1 wherein said input is coupled to receive said at least one exhaust gas at the point of generation of said exhaust gas.

4. The device of claim 3 wherein said exhaust gas destruction unit is a controlled decomposition and oxidation unit.

5. The device of claim 1 further including at least one additional input coupled to receive at least one additional exhaust gas.

6. The device of claim 1 wherein said submicron filter comprises a mist eliminator and a HEPA filter.

7. The device of claim 1 in which said mist screen is grounded and continuously washed by a water spray.

8. A submicron filter assembly, comprising:
   an input coupled to an exhaust gas destruction unit for receiving treated exhaust gas;

a submicron filter for filtering submicron particulates out of said treated exhaust gas; and an output through which said treated and filtered exhaust gas is expelled;

wherein said submicron filter comprises an electrostatic filter, said electrostatic filter comprises two charged grids to which high voltage alternating current is applied, and said grounded second grid includes a mist screen.

9. The submicron filter assembly of claim 8 wherein said output is coupled to an exhaust duct for passing said treated and filter exhaust gas to outside air.

10. The submicron filter assembly of claim 8 wherein said exhaust gas destruction unit is a controlled decomposition and oxidation unit.

11. The device of claim 8 wherein said input is coupled to receive at least one said exhaust gas at the point of generation of said exhaust gas.

12. The device of claim 8 wherein said submicron filter comprises a mist eliminator and a HEPA filter.

13. The device of claim 8 in which said mist screen is grounded and continuously washed by a water spray.

14. A method, comprising;

passing at least one exhaust gas into an enhaust gas destruction unit to treat at least one said exhaust gas;

passing said treated exhaust gas through a submicron filter assembly connected to said exhaust destruction unit to filter submicron particulates out of said treated exhaust gas; and passing said treated and submicron filtered exhaust gas to an exhaust output means;

wherein said submicron filter assembly comprises a mist eliminator and a HEPA filter.

15. The method of claim 14 wherein said submicron filter assembly comprises an electrostatic filter.

16. A device, comprising:

an input coupled to receive at least one exhaust gas;

an exhaust gas destruction unit connected to said input for treating said at least one exhaust gas;

a submicron filter assembly connected to said exhaust gas destruction unit for filtering submicron particulates out of said treated exhaust gas; and an output connected to said submicron filter assembly;

wherein said submicron filter comprises a mist eliminator and a HEPA filter.

17. A submicron filter assembly, comprising:

an input coupled to an exhaust gas destruction unit for receiving treated exhaust gas;

a submicron filter for filtering submicron particulates out of said treated exhaust gas; and an output through which said treated and filtered exhaust gas is expelled;

wherein said submicron filter comprises a mist eliminator and a HEPA filter.

* * * * *